Francis R. Hull
INVENTOR.

Francis R. Hull
*INVENTOR.*

Fig. 5

Francis R. Hull
INVENTOR.

Fig. 6

INVENTOR.
Francis R. Hull

United States Patent Office 3,621,654
Patented Nov. 23, 1971

1

3,621,654
REGENERATIVE GAS TURBINE POWER PLANT
Francis R. Hull, 567 E. 26th St., Brooklyn, N.Y. 11210
Continuation-in-part of application Ser. No. 847,779,
July 15, 1969. This application June 15, 1970,
Ser. No. 45,969
Int. Cl. F02c 7/10
U.S. Cl. 60—39.15                              27 Claims

ABSTRACT OF THE DISCLOSURE

This invention is directed to regenerative Brayton cycle gas turbine power plants of either the internal combustion type or the closed cyclic type wherein the compressed intake fluid stream is pre-heated through contact interchange in parallel flow with hot low-pressure turbine exhaust gases within velocity-accelerated contact-type heat exhangers. This invention is also directed to exhaust-fired gas turbine power plants wherein the compressed intake fluid stream is heated through contact interchange in parallel flow with high-temperature turbine exhaust gases directly following the combustion process within velocity-accelerated contact-type heat exchangers so as to limit both turbine inlet temperatures and the fouling of turbine blade surfaces.

The present invention is a continuation-in-part of my presently pending application Ser. No. 847,779 entitled "Regenerative Gas Turbine Power Plant" and filed July 15, 1969 (now abandoned); of my prior patent application Ser. No. 756,705 entitled "Regenerative Gas Turbine Power Plant" and filed July 31, 1968 (now abandoned); of my prior patent application Ser. No. 621,087 entitled "Regenerative Gas Turbine Power Plant " and filed Dec. 28, 1966 (now abandoned); of my prior patent application Ser. No. 552,997 entitled "Regenerative Gas Turbine Power Plant" and filed Apr. 19, 1966 (now abandoned); and of my prior patent application Ser. No. 399,277 entitled "Regenerative Gas Turbine Power Plant Process" and filed Sept. 25, 1964 (now abandoned).

This invention relates to the regenerative heating of intake fluids in gas turbine power plant processes by contact interchange between hot low-pressure, low-velocity exhaust fluids and high-velocity intake fluids in parallel flow before the intake fluid stream is substantially expanded within the gas turbine.

While the apparatus of the invention is mainly described in connection with the regenerative pre-heating of intake air-fluids in atmospheric gas turbine power plants, it will be understood by those skilled in the art that variations of the gas turbine power plant processes described using velocity-accelerated contact heat exchange methods may be employed for the purpose of improving gas turbine power plant processes in other applications.

As used herein,

The term "fluid" shall refer to any liquid or gaseous medium;

The term "compressible fluid" shall refer to any gaseous medium;

The term "exhaust fluid" shall refer to the discharge stream of combusted gases from an internal combustion engine, to the exhaust gases from any other heat engine, or to high-temperature gases leaving a combustion chamber or other heat source;

The term "intake fluid" shall relate to the incoming fluid stream (air) of pre-combustion gases to an internal combustion engine, the incoming fluid stream to a heat engine, the incoming fluid stream to the combustion chamber of any heat exchange apparatus, or to the incoming fluid stream to any other heat source before major quantities of thermal energy are added to the incoming fluid stream;

The term "heat engine" shall refer to a thermodynamic engine which may convert thermal or molecular energy in the working fluid stream to mechanical energy, or convert mechanical energy to thermal or molecular energy in the working fluid stream;

The term "heating fluid" shall refer to the low-temperature member of adjacent fluid streams in parallel flow which is being heated by contact interchange with an adjacent high-temperature fluid stream;

The term "cooling fluid" shall relate to the high-temperature member of adjacent fluid streams which is being cooled by contact interchange with an adjacent low-temperature fluid stream;

The term "contact interchange" shall relate to the fluid-to-fluid exchange of thermal and kinetic energy between adjacent fluid streams in parallel flow having substantially different velocities, and having no physical or mechanical separation between them;

The term "combusted fluid" shall refer to a fluid stream within which a combustion process has taken place following the injection of a combustible fuel;

The term "mixing length" shall refer to the effective linear dimension perpendicular to the direction of mean fluid flow within which contact interchange of thermal and kinetic energy shall take place between a heating fluid stream and a cooling fluid stream;

The term "characteristic length" shall refer to the effective linear dimension parallel to the direction of mean fluid flow within which energy transfer between particles of adjacent heating fluid and cooling fluid streams shall take place by means of contact interchange;

The term "regenerator" shall relate to a device which transfers thermal energy from hot exhaust gases in a thermal process or cycle to cooler intake fluids usually a part of the same process or cycle;

The term "atmospheric gas turbine regenerator" shall relate to a heat exchanger which partially recovers thermal energy from hot turbine exhaust gases that would otherwise be lost in discharge to the atmosphere, by transfer of this thermal energy so as to pre-heat the intake air-fluid stream.

The primary object of the invention is to provide a simplified gas turbine power plant process employing velocity-accelerated contact interchange methods for the regenerative pre-heating of intake air-fluids.

A further object is to provide a compact and practicable regenerative gas turbine power plant process effecting the pre-heating of intake air-fluids through contact interchange with hot low-pressure exhaust gases from the gas turbine, thereby increasing thermal efficiency and decreasing fuel consumption.

An additional object is to provide a compact and practicable regenerative gas turbine power plant process effecting the pre-heating of intake air-fluids which will eliminate the need to use closed, surface type regenerators in connection with atmosperic gas turbine power plant processes.

With the foregoing objects in view, together with others which will appear as the description proceeds, the invention resides in the novel assemblage and arrangement of system components in gas turbine power plant proceesses which will be described more fully in the discussion, illustrated in the drawings, and particularly pointed out in the claims.

The application of velocity-accelerated contact interchange to the regenerative pre-heating of intake air-fluids in atmospheric gas turbine power plant processes by hot low-pressure exhaust gases discharged from the gas turbine includes the following stages:

(1) Conversion of compressed intake air-fluid pressure energy to maximum kinetic energy within nozzle passages of the heat exchanger (2) Conversion of turbine exhaust gas kinetic energy to maximum effective pressure energy within diffuser passages of the heat exchanger (3) Bringing the high-velocity intake air-fluid stream and the low-velocity turbine exhaust gas stream into physical contact at substantially equal pressure within the mixing section of the heat exchanger while they are in parallel flow (traveling in the same direction) with respect to each other. The object at this stage is to divide flow within the mixing section of the heat exchanger into fluid laminae having greatly different momenta.

(4) The large difference in velocity between the two fluid streams accelerates energy transfer therebetween. Momentum is substantially transferred over an effective mixing length, and accelerates the transfer of thermal energy from the exhaust fluid stream over a characteristic length in the mixing section of the heat exchanger.

(5) After energy transfer between the contacting fluid stream is substantially complete, the greatly different inertias of the intake and exhaust fluid streams are utilized to effect a substantial physical separation of the fluid streams with in the separator-side section of the heat exchanger.

(6) The pre-heated intake fluid stream is routed to a down-stream combustion chamber or gas turbine, after passing through an appropriate flow-regulating diffuser passage.

(7) The cooled exhaust fluid stream is discharged to atmosphere from the heat exchanger.

The present application is related to my co-pending patent application Ser. No. 689,241 filed Nov. 29, 1967, and entitled "Compressible Fluid Contact Heat Exchanger"; and, as indicated earlier herein, it involves a physical and mechanical arrangement of regenerative atmospheric gas turbine power plant process apparatus which effects and facilitates the pre-heating of intake air-fluids by hot turbine exhaust gases, thereby improving the thermal efficiency of the gas turbine power plant. Physical and mechanical arragements of the invention include cycle apparatus of internal combustion atmospheric gas turbine power plants heated by both intake-fluid and exhaust-fluid combustion processes. Physical and mechanical arrangements of the invention also include cycle apparatus of externally-heated atmospheric gas turbine power plants, and cycle apparatus of externally-heated closed cycle gas turbine power plants.

The teachings of the present invention also involve the use of compact contact-type heat exchanger configurations and arrangements which are adaptable to space-limited power systems aboard ships, aircraft, trains and automobiles.

According to the present invention, low-pressure turbine exhaust gases, acting as the heat source to intake air-fluids passing through the heat exchange apparatus, enters the receiver-side section of the heat exchanger and is guided to a minimum-velocity, maximum-pressure state in an annular fluid passage surrounding a centrally-disposed intake fluid nozzle member. Pressurized intake fluid is supplied to the receiver-side nozzle passage of the heat exchanger by an appropriate fluid compressor.

The intake and exhaust fluid streams assume intimate contact with each other as the high-velocity intake fluid stream is discharged from the receiver-side nozzle passage into the mixing section of the heat exchanger. The several fluid streams leave the mixing section at nearly equal temperatures and substantially unequal velocities following the contact interchange process. The greatly differing inertias of the intake and exhaust fluid streams are used to effect their physical separation within the separator-side section of the heat exchanger. Pre-heated intake air-fluid is discharged from an appropriate diffuser passage to either a downstream combustion chamber or gas turbine, while the cooled exhaust gases are discharged to atmosphere.

The regenerative gas turbine power plant processes earlier described may also employ velocity-accelerated contact-type heat exchangers whose design is inverse of the arrangement described immediately hereinbefore. This type of contact heat exchanger guides the expansion of the compressed intake air-fluid stream within an outer annular nozzle passage of the heat exchanger, and guides the compression of the hot low-pressure turbine exhaust gases within a central diffuser passage to a minimum-velocity, maximum-pressure state. The aforesaid nozzle and diffuser passageways of the receiver-side section of the contact heat exchanger are adjacent to each other, and separated by a common nozzle-diffuser member. The contact interchange of thermal and kinetic energy takes place within the mixing section as previously described, after which the greatly differing inertias of the fluid streams are used to effect separation within the separator-side section of the heat exchanger. Pre-heated intake air-fluids are guided through a diffuser passage to a downstream combustion chamber or gas turbine, and the cooled exhaust gases are discharged to atmosphere as before.

Velocity-accelerated contact-type heat exchangers may also be employed in many other gas turbine cycle positions. In an exhaust-fired open-cycle gas turbine power plant system the combustion process occurs in the exhaust-gas stream, while the contact heat exchanger transfers thermal energy from the turbine exhaust-gas stream to heat the intake air-fluid stream before the turbine expansion process. A simple open-cycle atmospheric regenerative gas turbine power plant process may employ a velocity-accelerated contact-type regenerator while receiving major heat energy from a closed-type heat exchanger rather than from an internal combustion process. A simple closed-cycle regenerative gas turbine power plant process may employ a velocity-accelerated contact-type regenerator while the system receives major heat energy from one closed-type exchanger and rejects cycle heat energy from a second closed-type heat exchanger. An open-cycle atmspheric gas turbine power plant process may employ two velocity-accelerated contact-type heat exchangers in tandem with a combustion chamber therebetween, whereby one contact heat exchanger serves to diffuse combustion chamber heat energy and limit turbine inlet temperatures while the other contact heat exchanger serves as the cycle regenerator.

Figure 1:
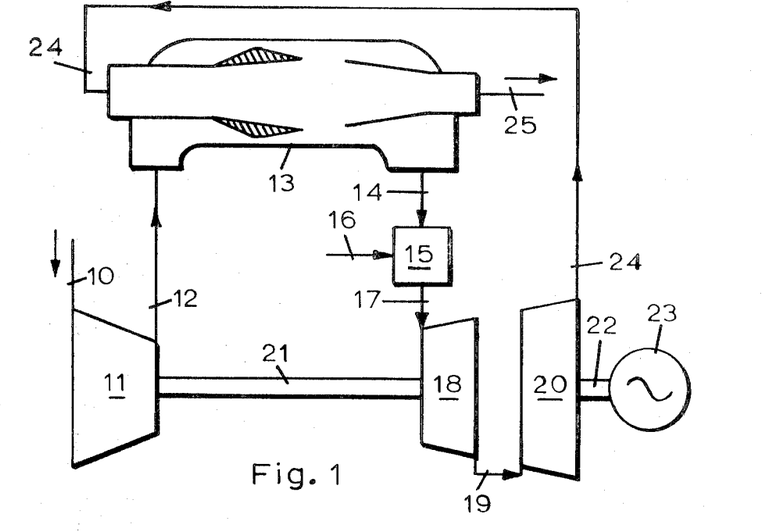
FIG. 1 is a simplified schematic diagram of an open-cycle atmospheric regenerative gas turbine power plant process wherein the intake air-fluid stream is pre-heated by the turbine exhaust-gas stream in a velocity-accelerated contact-type regenerator prior to the combustion process.

Referring more particularly to the accompanying drawings, FIG. 1 specifically illustrates the simplified schematic process diagram of the invention embodying the principal system apparatus of a regenerative, atmospheric gas turbine power plant. The illustrative embodiment of FIG. 1 shows an atmospheric gas turbine power plant of the semi-closed or Brayton-cycle variety including a velocity-accelerated, contact-type regenerator, the same possessing an annular nozzle passage and a central diffuser passage within the receiver-side section of its ducting chamber.

According to the illustrative embodiment of FIG. 1, atmospheric air at thermodynamic energy state 10 enters a compressor 11 (driven by shaft member 21 of gas-generator turbine 18) where it is compressed to thermodynamic energy state as represented at 12. The compressed intake air-fluid stream then enters contact heat exchanger 13 where it is preheated by contact interchange in parallel flow with the hot exhaust gases of free turbine 20.

The pre-heated intake fluid stream leaves contact heat exchanger 13 at thermodynamic energy state 14. The pre-heated intake fluid stream then enters the combustion chamber 15 where fuel is injected at thermodynamic energy state 16, and the combustion process proceeds therewithin. The high-temperature combusted fluid stream leaves the combustion chamber 15 at thermodynamic energy state 17, and is partially expanded in a gas-generator turbine 18 having a shaft member 21 which drives a compressor 11. The combusted fluid stream leaves the gas-generator turbine 18 at thermodynamic energy state 19, and is further expanded in a free turbine 20 having a shaft member 22 which drives an alternator 23 or other work-absorbing device. The combusted fluid leaves the free turbine 20 at thermodynamic energy state 24, and enters the contact heat exchanger 13 in a parallel flow direction with the intake fluid stream traveling between thermodynamic energy states 12 and 14.

Within the contact heat exchanger 13, the combusted exhaust fluid stream is cooled by contact interchange in parallel flow with the intake fluid stream, and is discharged to atmosphere at thermodynamic energy state 25.

Figure 2:
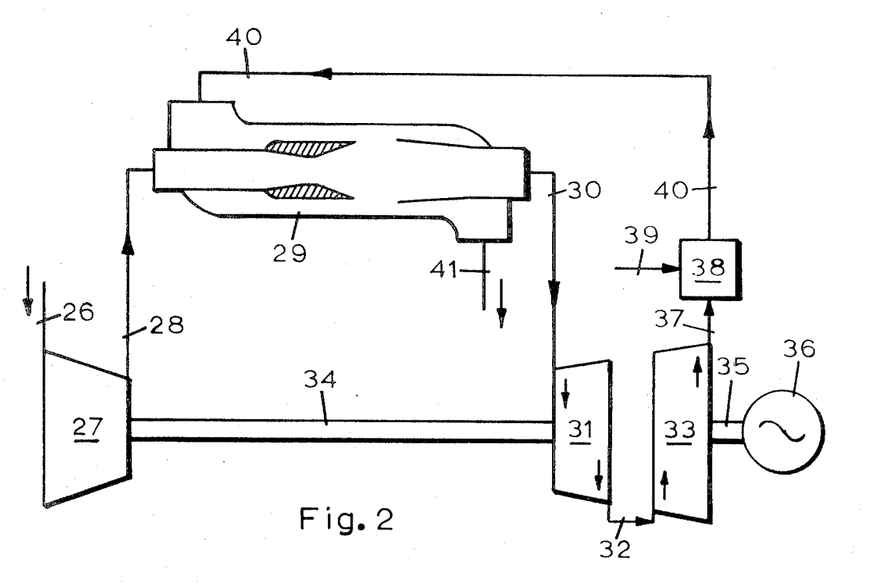
FIG. 2 is a simplified schematic diagram of an open-cycle exhaust-fired atmospheric gas turbine power plant process where in thermal energy is transferred from the combusted turbine exhaust-gas stream to heat the intake air-fluid stream in a velocity-accelerated contact-type heat exchanger before expansion of the intake-air fluid stream in the turbine.

The schematic process diagram of FIG. 2 represents a novel application of the velocity-accelerated contact interchange principal to the thermodynamic processes of an atmospheric gas turbine power plant, wherein the blading of the turbines is substantially protected from fouling by deposit of the products of combustion. All of the initial heating of the intake air-fluid stream is accomplished in a contact heat exchanger 29, and the combustion process is entirely carried out in the free turbine exhaust gas stream. Except for a small amount of entrained combustion products within the pre-heated intake fluid stream, no combustion products will pass directly through the gas-generator turbine 31 or the free turbine 33. The fouling of blading surfaces within the turbines by deposit of the products of combustion is thus bypassed almost entirely by the method of segregation.

Referring still to FIG. 2, atmospheric air at thermodynamic energy state 26 enters a compressor 27 driven by shaft member 34 of gas-generator turbine 31 where it is compressed to thermodynamic energy state 28. The compressed intake air stream then enters the contact heat exchanger 29 where it is pre-heated by contact interchange in parallel flow with the high temperature exhaust gases from the combustion chamber 38.

The pre-heated intake fluid stream leaves contact heat exchanger 29 at thermodynamic energy state 30, and is then expanded in a gas-generator turbine 31 driving compressor 27, etc. The pre-heated fluid stream leaves the gas-generator turbine 31 at thermodynamic energy state 32, and is then further expanded in the free turbine 33 having shaft member 35 which drives alternator 36 or other work-absorbing device. The expanded fluid stream leaves the free turbine 33 at thermodynamic energy state 37, and enters the combustion chamber 38. Within the combustion chamber 38 fuel is injected at thermodynamic energy state 39, and the combustion process proceeds therewithin.

The combusted high-temperature exhaust fluid stream leaves the combustion chamber 38 at thermodynamic energy state 40, and enters the contact heat exchanger 29 in parallel flow with the intake fluid stream traveling between thermodynamic energy states 28 and 30. Within contact heat exchanger 29 the combusted exhaust fluid stream is cooled by contact interchange in parallel flow with the intake fluid stream, and is then discharged to the atmosphere at thermodynamic energy state 41.

It should be particularly noted that the contact heat exchanger 13 of FIG. 1 and the contact heat exchanger 29 of FIG. 2 are inverted forms of the other; and that the contact heat exchanger 29 may readily be substituted for the contact heat exchanger 13 in FIG. 1 and vice versa. In other words, either contact heat exchanger 13 or 29 may be alternately substituted in the position shown.

Figure 3:
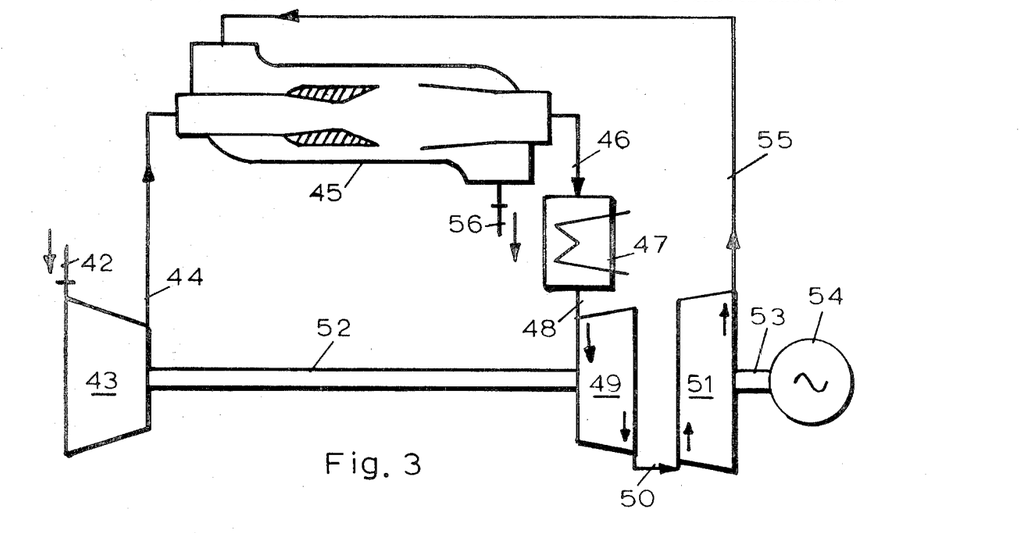
FIG. 3 is a simplified schematic diagram of an open-cycle atmosphreic regenerative gas turbine power plant process wherein the intake air-fluid stream is pre-heated by the turbine exhaust-gas stream in a velocity-accelerated contact-type regenerator before major heating of the intake air-fluid stream occurs in a segregated closed-type heat exchanger.

The schematic process diagram of FIG. 3 discloses an atmospheric gas turbine power plant heated by segregated external intake-fluid heating processes, but which is otherwise similar to the internal combustion atmospheric gas turbine power plant disclosed in FIG. 1. Atmospheric air at thermodynamic energy state 42 enters compressor 43 (driven by shaft member 52 of gas-generator turbine 49) where it is compressed to thermodynamic energy state 44. The compressed air intake stream then enters contact heat exchanger 45 where it is pre-heated by contact interchange in parallel flow with hot low-pressure exhaust gases from free turbine 51.

The pre-heated intake fluid stream leaves contact heat exchanger 45 at thermodynamic energy state 46, and enters closed surface-type heat exchanger 47 where major quantities of heat energy are transferred to the pre-heated intake-fluid stream. The high-temperature intake-fluid stream leaves surface-type heat exchanger 47 at thermodynamic energy state 48, and is partially expanded in gas-generator turbine 49 (driving compressor 43, etc.). The partially expanded intake-fluid stream leaves gas-generator turbine 49 at thermodynamic energy state 50, and is then further expanded in free turbine 51 (driving alternator 54 or other work-absorbing device by shaft member 53) to thermodynamic energy state 55. The hot low-pressure exhaust-fluid stream (air) then enters contact heat exchanger 45 in parallel flow with the intake-fluid stream traveling between thermodynamic energy states 44 and 46. Within contact heat exchanger 45, the exhaust-fluid stream is cooled in parallel flow with the high-velocity intake-fluid stream and then discharged to atmosphere at thermodynamic energy state 56.

Figure 4:
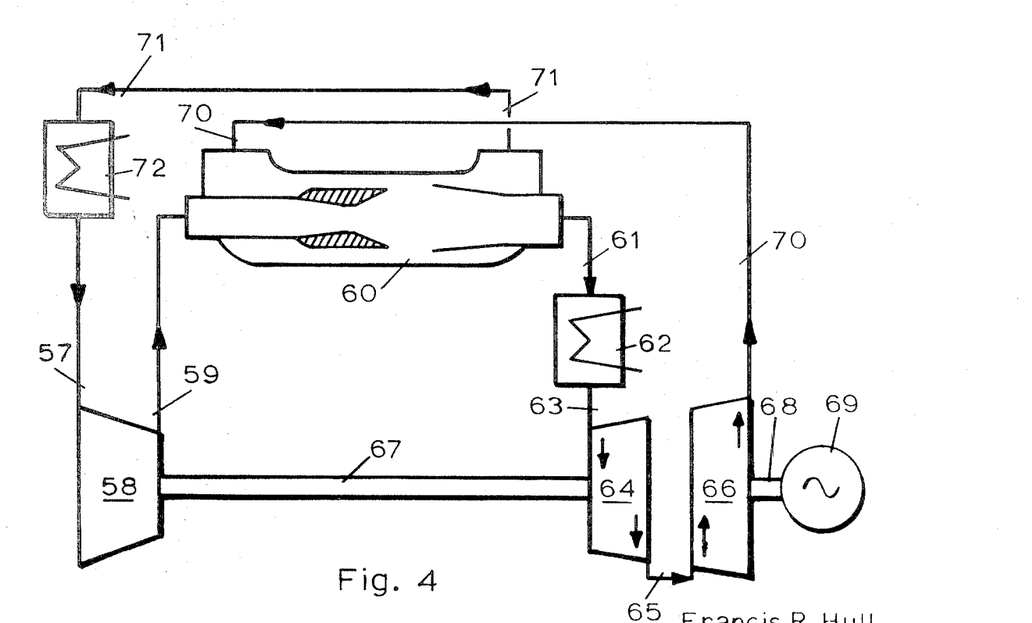
FIG. 4 is a simplified schematic diagram of a closed cycle regenerative gas turbine power plant process wherein the intake working-fluid stream is pre-heated by the turbine exhaust-gas stream in a velocity-accelerated contact-type regenerator before major heating of the intake-fluid stream, while major heating and cycle heat rejection processes occur in segregated closed-type heat exchangers.

The schematic process diagram of FIG. 4 discloses a closed-cycle gas turbine power plant heated by segregated external intake-fluid heating processes, and which rejects heat through a closed surface-type exhaust-fluid stream heat exchanger. Compressor 58 receives cooled low-pressure intake fluid at thermodynamic energy state 57, and discharges the compressed intake fluid stream at thermodynamic energy state 59 to contact heat exchanger 60. The compressed intake-fluid stream is pre-heated within contact heat exchanger 60 by contact interchange in parallel flow with hot low-pressure exhaust fluids from free turbine 66.

The pre-heated intake-fluid stream leaves contact heat exchanger 60 at thermodynamic energy state 61, and enters closed surface-type heat exchanger 62, where the major heating process of the cycle occurs. The high-temperature intake-fluid stream leaves surface-type heater 62 at thermodynamic energy state 63, and is partially expanded in gas-generator turbine 64 (driving compressor 58 through shaft member 67) to thermodynamic energy state 65. The partly expanded intake-fluid stream is next further expanded in free turbine 66 (driving alternator or other work-absorbing device 69 by shaft member 68) to thermodynamic energy state 70. The hot low-pressure exhaust-fluid stream then enters contact heat exchanger 60 in parallel flow with the intake-fluid stream traveling between thermodynamic energy states 59 and 61. Within contact heat exchanger 60, the exhaust-fluid stream is cooled in parallel flow with the high-velocity intake-fluid stream and then discharged at thermodynamic energy state 71. The cooled exhaust-fluid stream enters closed surface-type heat exchanger 72 at thermodynamic energy state 71, and is discharged therefrom as cooled low-pressure intake fluid at thermodynamic energy state 57.

Figure 5:
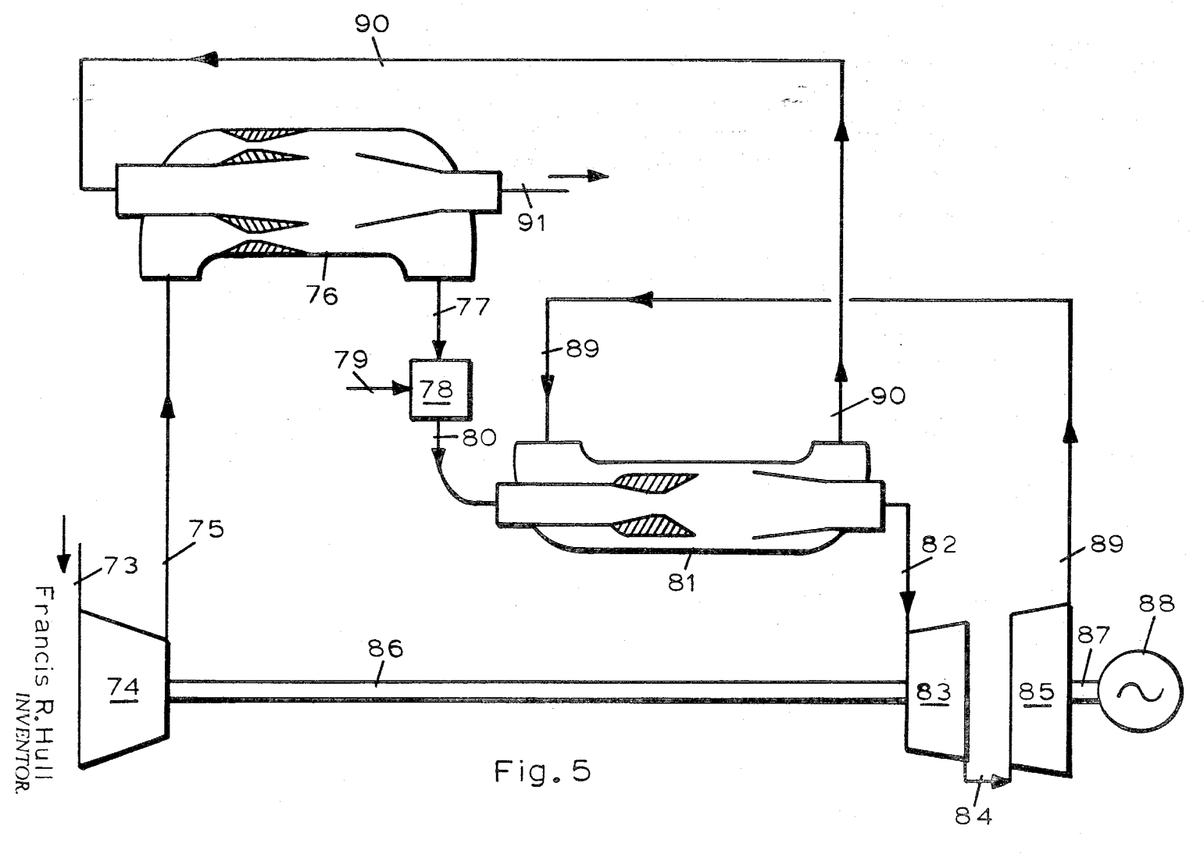
FIG. 5 is a simplified schematic diagram of an open-cycle atmospheric regenerative gas turbine power plant employing two tandem velocity-accelerated contact-type heat exchangers with a combustion process therebetween, whereby one contact heat exchanger serves to diffuse combustion chamber heat energy and limit turbine inlet temperatures while the other contact heat exchanger serves as the cycle regenerator.

In the illustrative embodiment of FIG. 5, atmospheric air at thermodynamic energy state 73 enters compressor 74 (driven by shaft member 86 of gas-generator turbine 83), where it is compressed to thermodynamic energy state 75. The compressed intake air-fluid stream then enters the outer nozzle annulus of contact heat exchanger 76 where it is pre-heated by contact interchange in parallel flow with hot exhaust gases discharged from downstream contact heat exchanger 81.

The pre-heated intake-fluid stream leaves contact heat exchanger 76 at thermodynamic energy state 77. The pre-heated intake-fluid stream next enters combustion chamber 78 where fuel is injected at thermodynamic energy state 79, and the combustion process proceeds therewithin. The high-temperature combusted fluid stream leaves combustion chamber 78 at thermodynamic energy state 80, and enters the central nozzle passage of contact heat exchanger 81.

Within contact heat exchanger 81, the high-temperature combusted fluid stream is moderately cooled by contact interchange in parallel flow with hot exhaust gases of free turbine 85, as heat energy received in the combustion process is partially diffused to limit turbine inlet temperatures. The high-temperature combusted fluid stream leaves contact heat exchanger 81 at thermodynamic energy state 82, and is partially expanded in gas-generator turbine 83 (driving compressor 74, etc.). The partly expanded intake-fluid stream leaves gas-generator turbine 83 at thermodynamic energy state 84, and is then further expanded in free turbine 85 (driving alternator 88 or other work-absorbing device by shaft member 87) to thermodynamic energy state 89.

The hot turbine exhaust-gas stream at thermodynamic energy state 89 enters contact heat exchanger 81, where it is moderately heated by contact interchange in parallel flow with the combusted high-temperature fluid stream discharged from combustion chamber 78. The hot exhaust-gas stream is discharged from the outer annulus of contact heat exchanger 81 at thermodynamic energy state 90.

The hot exhaust-gas stream discharged at thermodynamic energy state 90 from contact heat exchanger 81 enters the central fluid passage of contact heat exchanger 76 in parallel flow with the intake-fluid stream supplied by compressor 74 at thermodynamic energy state 75. Within contact heat exchanger 76, the hot exhaust-gas stream is cooled by contact interchange in parallel flow with the intake-fluid stream and finally discharged to atmosphere at thermodynamic energy state 91.

It should be noted that the open-cycle atmospheric gas turbine power plants disclosed in connection with FIGS. 1, 2, 3, 5 and 6 reject heat energy directly to the atmosphere. The closed-cycle gas turbine power plant disclosed in connection with FIG. 4 rejects heat energy through the closed surface-type cooler 72, and may use any appropriate gaseous medium as a working fluid.

A further contact-type regenerative Brayton cycle variation is adapted for reduced compressor back work, increased work capacity and higher thermal efficiency. The work of compressing the intake air-fluid stream is reduced through a cooling process by addition of a closed surface-type heat exchanger between compressor stages. A higher temperature turbine exhaust to facilitate greater heat transfer in the regenerator is provided through a staged heat supply by disposing a second combustion chamber between turbine stages. With real machines, the reduction in relative back work through interstage compressor cooling and interstage turbine heating in regenerative Brayton cycles is expected to provide substantial gains in thermal efficiency.

Figure 6:
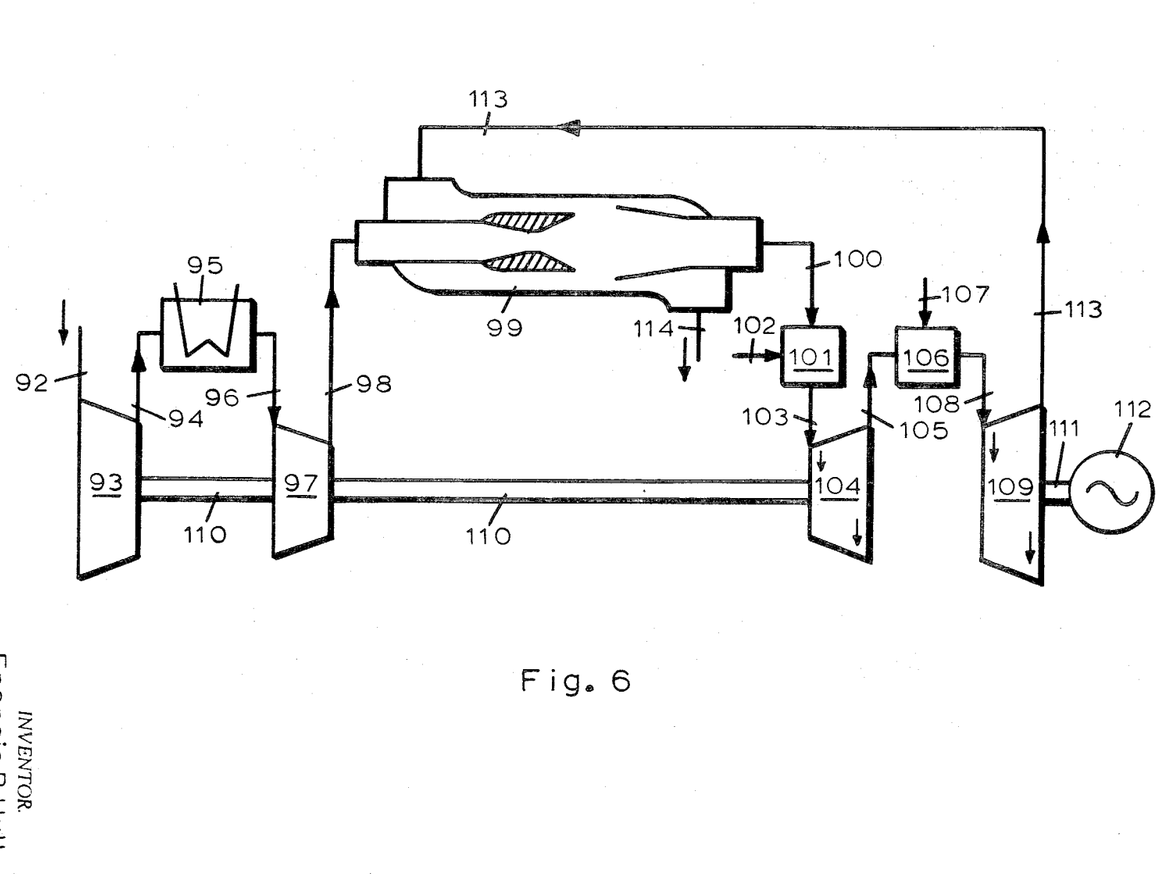
FIG. 6 is a simplified schematic diagram of an open-cycle atmospheric regenerative gas turbine power plant which incorporates intercooling between compressor stages and a second combustion process between gas turbine stages in its cyclic processes.

Referring to FIG. 6, atmospheric air at thermodynamic energy state 92 enters compressor stage 93 (driven by shaft member 110 of gas generator turbine 104) where it is compressed to termodynamic energy state 94. The compressed intake fluid stream then enters closed surface-type heat exchanger 95 where it is cooled at approximately constant pressure to a lesser specific volume at thermodynamic energy state 96. The cooled compressed intake fluid stream then enters compressor stage 97 (driven by shaft member 110 of gas generator turbine 104) where it is compressed to thermodynamic energy state 98. The compressed intake air-fluid stream then enters contact heat exchanger 99 where it is pre-heated by contact interchange in parallel flow with the hot exhaust gases of free turbine 109.

The pre-heated intake fluid stream leaves contact heat exchanger 99 at thermodynamic energy state 100 and enters combustion chamber 101 where fuel is added at thermodynamic energy state 102. Following the combustion process, the high-temperature combusted fluid stream at thermodynamic energy state 103 enters gas generator turbine 104 (which drives compressor stages 93 and 97 by shaft member 110). The high-temperature combusted fluid stream is partly expanded within gas generator turbine 104 to a lower pressure and temperature at thermodynamic energy state 105, and then enters combustion chamber 106.

Fuel at thermodynamic energy state 107 enters combustion chamber 106, and the second combustion process occurs therewithin. The re-combusted high-temperature fluid stream leaves combustion chamber 106 at thermodynamic energy state 108 and then enters free turbine 109. The re-combusted fluid stream is next further expanded in free turbine 109 (which drives alternator or other work-absohrbing device 112 by shaft member 111) to thermodynamic energy state 113. The re-combusted exhaust fluid stream at thermodynamic energy state 113 then enters contact heat exchanger 99 for cooling by contact interchange in parallel flow with the intake fluid stream, and is finally discharged to atmosphere at thermodynamic energy state 114.

Multi-shaft regenerative cycle variations are also feasible for either part-load operations or for the satisfaction of transient auxiliary loads. Such regenerative cycle configurations may have beneficial use at several distinctly different operating conditions.

Figure 7:
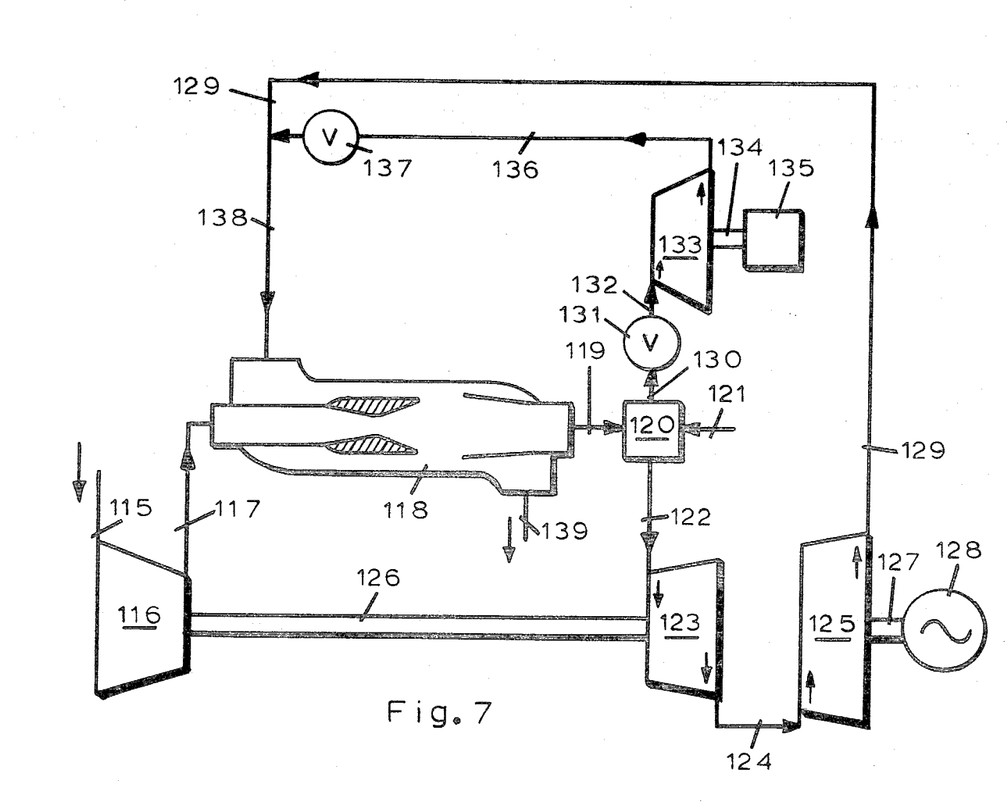
FIG. 7 is a simplified schematic diagram of a multi-shaft open-cycle atmospheric regenerative gas turbine power plant wherein a single compressor, a single velocity-accelerated contact-type heat exchanger and a single combustion chamber are disposed in parallel with two separate gas turbines in a cycle configuration which effects the regenerative pre-heating of combustion air for both turbine systems in their common contact-type regenerator.

In the regenerative multi-shaft Brayton cycle illustrated in the embodiment of FIG. 7, atmospheric air at thermodynamic energy state 115 enters common compressor 116 (driven by shaft member 126 of gas generator turbine 123) where it is compressed to thermodynamic energy state 117. The compressed intake air-fluid then enters common contact heat exchanger 118 where it is pre-heated by contact interchange in parallel flow with hot exhaust gases from both free turbine 125 and auxiliary gas turbine 133.

The pre-heated intake-fluid stream leaves common contact heat exchanger 118 at thermodynamic energy state 119 and enters common combustion chamber 120 where fuel is added at thermodynamic energy state 121. Following the combustion process, the high-temperature gases leave combustion chamber 120 in separate fluid streams at common thermodynamic energy state 130. One high-temperature gas stream at thermodynamic energy state 130 supplies inlet branch 122 of gas generator turbine 123. The other high-temperature gas stream at thermodynamic energy state 130 supplies valved inlet branch 132 of auxiliary gas turbine 133.

The high-temperature combusted fluid stream entering gas generator turbine 123 (which drives common compressor 116 by shaft member 126) is expanded therewithin to a lower pressure and temperature at thermodynamic energy state 124. The partly expanded combusted fluid stream exhausted from gas generator turbine 123 is further expanded in free turbine 125 having a shaft member 127 which drives alternator or other work-absorbing device 128. The hot exhaust gases leave free turbine 125 at thermodynamic energy state 129 to co-mingle with hot exhaust gases from auxiliary gas turbine 133 at thermodynamic energy state 136. The combined exhaust gas stream from free turbine 125 and auxiliary gas turbine 133 at common thermodynamic energy state 138 enters contact heat exchanger 118 for cooling by contact interchange in parallel flow with the intake fluid stream, and is finally discharged to atmosphere at thermodynamic energy state 139.

The high-temperature combusted fluid stream serving auxiliary gas turbine 133 flows from common combustion chamber 120 past valve 131 into inlet branch 132. Auxiliary gas turbine 133 drives work absorbing device 135 by shaft member 134. The combusted gases are expanded within auxiliary gas turbine 133 to thermodynamic energy state 136, and flow past valve 137 to mix with the main cycle flow of hot exhaust gases as received from free turbine 125.

Auxiliary gas turbine cycle branch 131–137 may be alternately isolated from the main regenerative gas turbine cycle 115–130 and 138–139 inclusive by the closure of valve 131 and valve 137. It should also be noted that valve 131 may be used as a throttle valve to regulate the speed of auxiliary gas turbine 133 when cycle branch 131–127 is open and in active use.

Figure 8:
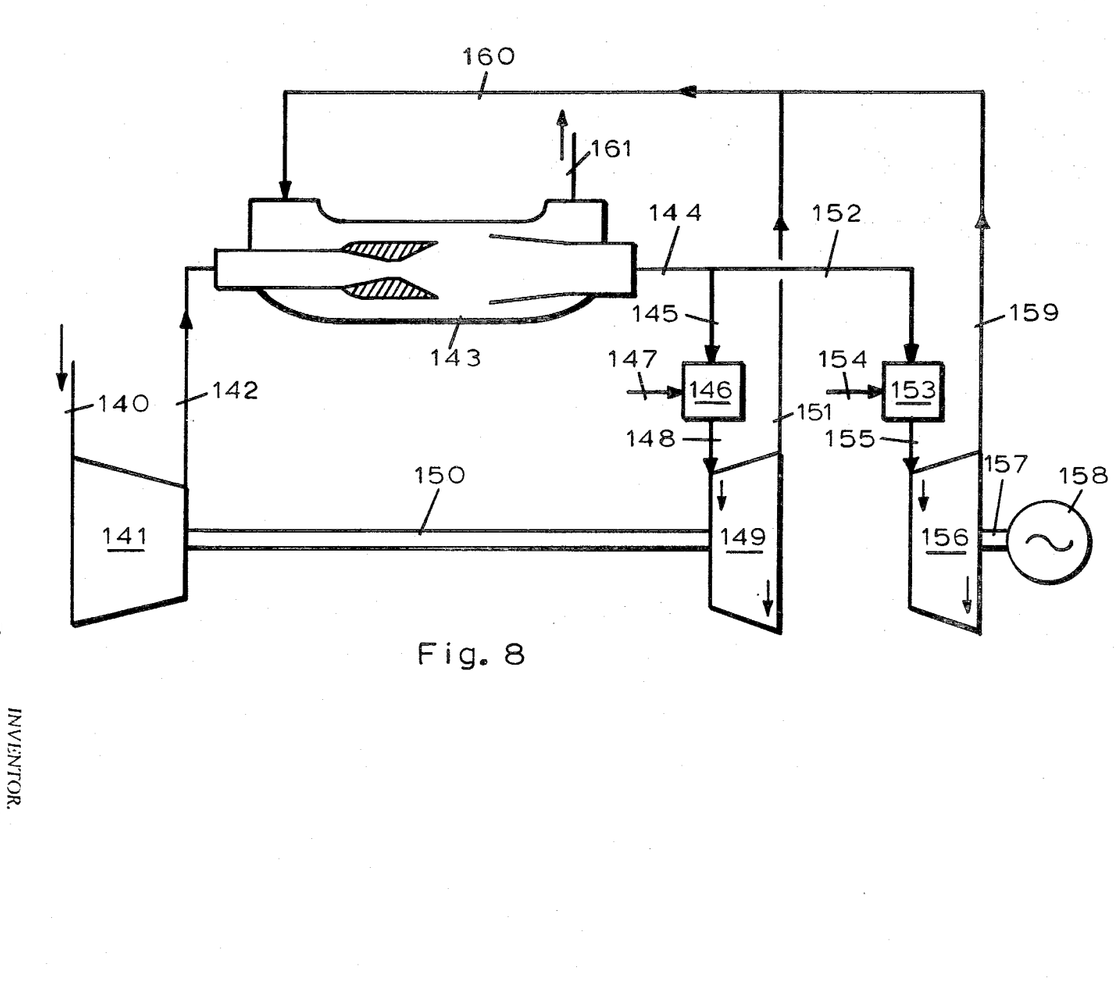
FIG. 8 is a simplified schematic diagram of a multi-shaft open-cycle atmospheric regenerative gas turbine power plant wherein the gas generator turbine with an individual combustion chamber and the free turbine with an individual combustion chamber are connected in parallel with respect to each other in the cycle configuration to provide for the separate control of turbine inlet temperature and shaft speed of each gas turbine member.

In the regenerative multi-shaft Brayton cycle illustrated in the embodiment of FIG. 8, atmospheric air at thermodynamic energy state 140 enters compressor 141 (driven by shaft member 150 of gas generator turbine 149) where it is compressed to thermodynamic energy state 142. The compressed intake air-fluid then enters common contact heat exchanger 143 where it is pre-heated by contact interchange in parallel flow with hot exhaust gases from both free turbine 156 and gas generator turbine 149. The pre-heated intake-fluid stream discharged from common contact heat exchanger 143 at thermodynamic energy state 144 is divided into plural intake-fluid streams flowing through turbine supply branches 145 and 152.

The pre-heated intake-fluid stream flowing through turbine supply branch 145 enters combustion chamber 146 where fuel is added at thermodynamic energy state 147. The high-temperature combusted fluid stream is discharged from combustion chamber 146 at thermodynamic energy state 148 and enters gas generator turbine 149. Within gas generator turbine 149 (which drives compressor 141 by shaft member 150), the high-temperature combusted fluid stream is expanded to thermodynamic energy state 151. The hot exhaust gases from gas generator turbine 149 at thermodynamic energy state 151 co-mingle with hot exhaust gases from free turbine 156 at thermodynamic energy state 159 to achieve a common thermodynamic energy state 160.

The pre-heated intake-fluid stream flowing through turbine supply branch 152 enters combustion chamber 153 where fuel is added at thermodynamic energy state 154. The high-temperature combusted fluid stream is discharged from combustion chamber 153 at thermodynamic energy state 155 and enters free turbine 156. Free turbine 156 drives alternator or other work-absorbing device 158 by means of shaft member 157. The high-temperature combusted fluid stream is expanded within free turbine 156 to thermodynamic energy state 159, after which the exhaust gases at energy state 159 are combined with the exhaust gases of gas generator turbine 149 at energy state 151 to achieve a common thermodynamic energy state 160.

The combined exhaust fluid streams at thermodynamic energy state 160 enter contact heat exchanger 143 for cooling by contact interchange in parallel flow with the intake-fluid stream. The cooled exhaust gases are finally discharged to atmosphere from contact heat exchanger 143 at thermodynamic energy state 161.

From the foregoing, it is evident that the present invention provides means for effecting a significant exhaust heat recovery in both atmospheric and closed-cycle gas turbine power plants. In addition, the velocity-accelerated contact heat exchangers applied in the various gas turbine cycle configurations permit advantageous applications in space-limited power plant systems for ships, aircraft, trains and automobiles.

I claim:

1. A regenerative gas turbine power plant comprising, in combination, a gas turbine member; a compressor member driven by said gas turbine member; a non-reversing, single-pass fluid-to-fluid contact heat exchanger; said contact heat exchanger being adapted to effect the regenerative pre-heating of compressed intake fluids for said gas turbine member before combustion by contact interchange with hot low-pressure gases from the exhaust of said gas turbine member; a combustion chamber; said combustion chamber being adapted to receive the pre-heated intake fluid stream discharged from said regenerative contact heat exchanger and supplying combustible fuel thereto; the combustion process within said combustion chamber being upstream with respect to the thermal expansion process within said gas turbine member; means for transferring to said regenerative contact heat exchanger the compressed intake fluids discharged from said compressor member; means for transferring to said regenerative contact heat exchanger hot, low-pressure exhaust gases discharged from said gas turbine member; said regenerative contact heat exchanger being adapted to receive and exchange energy between the compressed intake fluid stream and hot, low-pressure exhaust gases discharged from said gas turbine member while particles of the said intake and exhaust fluid streams are in contact and possess substantially unequal and parallel velocity vectors with respect to each other; said regenerative contact heat exchanger being adapted to separate the aforesaid intake fluid and exhaust gas streams following the contact interchange of energy therebetween, and to discharge cooled exhaust gases to the atmosphere; and means for transferring the pre-heated intake fluid stream discharged from the said regenerative contact heat exchanger to the inlet of said combustion chamber and from the exit of said combustion chamber to the inlet of said gas turbine member; whereby the energy present in the high-temperature combusted fluid stream is partially converted to useful mechanical energy as said combusted fluid stream is expanded within said gas turbine member.

2. The regenerative gas turbine power plant of claim 1 wherein the regenerative contact heat exchanger includes a closed plenum or ducting chamber providing a centrally-disposed diffuser passage enclosed by an annular enveloping nozzle passage in the receiver section thereof; said regenerative contact heat exchanger being adapted to discharge separated intake and exhaust fluid streams after the contact interchange of energy therebetween.

3. The regenerative gas turbine power plant of claim 1 wherein the regenerative contact heat exchanger includes a closed plenum or ducting chamber providing a centrally-disposed nozzle passage enclosed by an annular enveloping diffuser passage in the receiver section thereof; said regenerative contact heat exchanger being adapted to discharge separated intake and exhaust fluid streams after the contact interchange of energy therebetween.

4. An exhaust-heated gas turbine power plant comprising in combination, a gas turbine member; a compressor member driven by said gas turbine member; a combustion chamber; said combustion chamber being adapted to receive the exhaust fluid stream discharged from said gas turbine member and supplying combustible fuel thereto; the combustion process within said combustion chamber being downstream of and segregated from the thermal expansion process within the said gas turbine; a non-reversing, single-pass fluid-to-fluid contact heat exchanger; said non-reversing contact heat exchanger being adapted to transfer thermal energy from the combusted, high-temperature exhaust fluid stream to the intake fluid stream serving the said gas turbine member so as to limit turbine inlet temperature with respect to the ash fusion properties of the fuel utilized; means for transferring the hot, low-pressure exhaust gases discharged from said gas turbine member to the inlet of said combustion chamber; means for transferring the combusted, high-temperature exhaust fluid stream from the exit of said combustion chamber to the said non-reversing contact heat exchanger; said non-reversing contact heat exchanger being adapted to receive and exchange energy between the compressed intake fluid stream and combusted high-temperature exhaust gases discharged from said combustion chamber member while particles of the said intake and exhaust fluid streams are in contact and possess substantially unequal and parallel velocity vectors with respect to each other; said non-reversing contact heat exchanger being adapted to separate the aforesaid intake fluid and exhaust gas streams after the contact interchange of energy therebetween, and to discharge cooled exhaust gases to the atmosphere; means for transferring the pre-heated intake fluid stream discharged from said non-reversing contact heat exchanger to the inlet of said gas turbine member, whereby the energy present in the heated, pressurized intake fluid stream is partially converted to useful mechanical energy as the said intake fluid stream is expanded within the gas turbine member; the said non-reversing contact heat exchanger serving as the direct heat source for the gas turbine, thereby segregating the combustion process from the thermodynamic expansion process taking place within said gas turbine, thus alleviating the fouling to gas turbine blading surfaces by deposit of solid combustion products resulting from the aforesaid combustion process.

5. The exhaust-heated gas turbine power plant of claim 4 wherein the non-reversing contact heat exchanger includes a closed plenum or ducting chamber providing a centrally-disposed diffuser passage enclosed by an annular enveloping nozzle passage in the receiver section thereof; said contact heat exchanger being adapted to discharge separated intake and exhaust fluid streams after the contact interchange of energy therebetween.

6. The exhaust-heated gas turbine power plant of claim 4 wherein the non-reversing contact heat exchanger includes a closed plenum or ducting chamber providing a centrally-disposed nozzle passage enclosed by an annular enveloping diffuser passage in the receiver section thereof; said contact heat exchanger being adapted to discharge separated intake and exhaust fluid streams after the contact interchange of energy therebetween.

7. A regenerative gas turbine power plant comprising in combination, a gas turbine member; a compressor member driven by said gas turbine member; a non-reversing, single-pass fluid-to-fluid contact heat exchanger; said contact heat exchanger being adapted to effect the regenerative pre-heating of compressed intake fluids for the gas turbine before its major heating process by contact interchange with hot low-pressure turbine exhaust fluids; a closed heat exchanger member adapted to receive the pre-heated intake fluid discharge from said regenerative contact heat exchanger and to transfer substantial quantities of thermal energy thereto in the major heating process of the gas turbine cycle; the major heating process taking place within the said closed heat exchanger member being upstream with respect to the thermal expansion process taking place within said gas turbine member; means for transferring to said regenerative contact heat exchanger the compressed intake fluids discharged from said compressor member; means for transferring to said regenerative contact heat exchanger hot low-pressure exhaust fluids discharged from said gas turbine member; said regenerative contact heat exchanger being adapted to receive and exchange energy between the compressed intake fluid stream and the hot low-pressure exhaust fluid stream while particles of the said intake and exhaust fluid streams are in contact and possess substantially unequal and parallel velocity vectors with respect to each other; said regenerative contact heat exchanger being adapted to separate the aforesaid intake fluid and exhaust fluid streams following the contact interchange of energy therebetween, and to discharge cooled exhaust gases to the atmosphere; means for transferring the pre-heated intake fluid stream discharged from said regenerative contact heat exchanger to the inlet of said closed heat exchanger member for the major heating process; and means for transferring the high-temperature discharge from said closed heat exchanger member to the inlet of said gas turbine member, whereby the energy present in the high-temperature intake fluid stream is partially converted to useful mechanical energy as thermal expansion takes place within the gas turbine member; the external effect of the said regenerative contact heat exchanger being to pre-heat the intake fluid stream before the major heating process takes place within said closed heat exchanger member.

8. The regenerative gas turbine power plant of claim 7 wherein the regenerative contact heat exchanger includes a closed plenum or ducting chamber providing a centrally-disposed diffuser passage enclosed by an annular enveloping nozzle passage in the receiver section thereof; said regenerative contact heat exchanger being adapted to discharge separated intake and exhaust fluid streams after the contact interchange of energy therebetween.

9. The regenerative gas turbine power plant of claim 7 wherein the regenerative contact heat exchanger includes a closed plenum or ducting chamber providing a centrally-disposed nozzle passage enclosed by an annular enveloping diffuser passage in the receiver section thereof; said regenerative contact heat exchanger being adapted to discharge separated intake and exhaust fluid streams after the contact interchange of energy therebetween.

10. A closed-cycle regenerative gas turbine power plant comprising in combination, a gas turbine member; a compressor member driven by said gas turbine member; a compressible fluid contact heat exchanger, said compressible fluid contact heat exchanger being adapted to effect the regenerative pre-heating of compressed intake fluids before major heating thereof by contact interchange with hot low-pressure turbine exhaust fluids; a closed heat exchange member adapted to receive the pre-heated intake fluid discharge from said compressible fluid contact heat exchanger and transferring substantial quantities of thermal energy thereto, the major heating process taking place within said closed heat exchanger member being upstream with respect to the thermal expansion process taking place within said gas turbine member; a closed heat exchanger member adapted to receive the cooled turbine exhaust fluids discharged from said compressible fluid contact heat exchanger and transferring substantial quantities of thermal energy therefrom by cooling in the major heat rejection process of the gas turbine cycle; means for transferring to said compressible fluid contact heat exchanger the compressed intake fluids discharged from said compressor member; means for transferring to said compressible fluid contact heat exchanger hot-low-pressure exhaust fluids discharged from said gas turbine member; said compressible fluid contact heat exchanger being adapted to receive and exchange energy between the compressed intake fluid stream and the low-pressure exhaust fluid stream from said gas turbine member while the same are in contact and flowing parallel with respect to each other; said contact heat exchanger being adapted to separate the aforesaid intake-fluid and exhaust-fluid streams after the contact interchange of energy therebetween and to discharge cooled exhaust fluids to a downstream heat exchanger for further cooling; means for transferring the pre-heated intake-fluid stream discharged from said compressible fluid contact heat exchanger to the inlet of said closed heat exchanger providing major heating thereof; means for transferring the high-temperature discharge from the aforesaid closed heat exchanger to the inlet of said gas turbine member for thermal expansion therein whereby the energy present in the high-temperature fluid is partially converted to useful mechanical energy; means for transferring the cooled turbine exhaust fluids discharged from said compressible fluid contact heat exchanger to the said closed heat exchanger providing major cooling and cycle heat rejection; and means for transferring cooled low-pressure intake fluids to the inlet of said compressor member from the outlet of said closed heat exchanger member providing major cooling and cycle heat rejection; the external effect of said compressible fluid contact heat exchanger upon the entire closed-cycle gas turbine power plant being to pre-heat the intake fluid stream before major cycle heating processes occur.

11. The closed-cycle regenerative gas turbine power plant of claim 10, wherein the compressible fluid contact heat exchanger includes a closed plenum or ducting chamber providing a centrally-disposed diffuser passage enclosed by an annular enveloping nozzle passage in the receiver section thereof; said compressible fluid contact heat exchanger being adapted to discharge therefrom separated intake and exhaust fluid streams after the contact interchange of energy therebetween.

12. The closed-cycle regenerative gas turbine power plant of claim 10, wherein the compressible fluid contact heat exchanger includes a closed plenum or ducting chamber providing a centrally-disposed nozzle passage enclosed by an annular enveloping diffuser passage in the receiving section thereof; said compressible fluid contact heat exchanger being adapted to discharge therefrom separated intake and exhaust fluid streams after the contact interchange of energy therebetween.

13. A regenerative gas turbine power plant comprising in combination, a gas turbine member; a compressor member driven by said gas turbine member; a tandem pair of non-reversing single-pass fluid-to-fluid contact heat exchangers with a combustion chamber disposed therebetween; whereby the upstream regenerative contact heat exchanger is adapted to effect the regenerative pre-heating of compressed intake fluids for said gas turbine member before combustion by contact interchange with hot low-pressure exhaust gases discharged from the downstream contact heat exchanger; the said combustion chamber being disposed to receive the pre-heated intake-fluid stream discharged from the upstream contact heat exchanger and to supply combustible fuel thereto; the said combustion chamber being disposed to discharge high-temperature combusted intake fluids to the inlet of said downstream contact heat exchanger; whereby the said downstream contact heat exchanger is adapted to moderately cool high-temperature combusted intake fluids by contact interchange with hot low-pressure gases from the exhaust of said gas turbine member so as to limit turbine inlet temperatures; means for transferring to said upstream regenerative contact heat exchanger the compressed intake fluids discharged from said compressor member; means for transferring to said upstream regenerative contact heat exchanger hot low-pressure exhaust gases discharged by said downstream contact heat exchanger; means for transferring the pre-heated intake-fluid stream discharged from said upstream regenerative contact heat exchanger to the inlet of said combustion chamber and from the outlet of said combustion chamber to the inlet of said downstream contact heat exchanger; the said upstream regenerative contact heat exchanger being adapted to receive and exchange energy between the compressed intake-fluid stream and hot low-pressure exhaust stream discharged from said downstream contact heat exchanger while particles of the said intake-fluid and exhaust-fluid streams are in contact and possess substantially unequal and parallel velocity vectors with respect to each other; the said upstream regenerative contact heat exchanger being adapted to separate the aforesaid intake-fluid and exhaust-gas streams following the contact interchange of energy therebetween, and to discharge cooled exhaust gases to atmosphere; means for transferring to the said downstream contact heat exchanger hot low-pressure exhaust gases discharged from said gas turbine member; the said downstream contact heat exchanger beng adapted to receive and exchange energy between the combusted high-temperature intake-fluid stream and hot low-pressure exhaust gases discharged from said gas turbine member while particles of the said high-temperature intake fluid and exhaust gas streams are in contact and possess substantially unequal and parallel velocity vectors with respect to each other; the said downstream contact heat exchanger being adapted to separate the aforesaid high-temperature intake-fluid and exhaust-fluid streams following the contact interchange of energy therebetween; means for transferring the high-temperature intake-fluid discharge from the said downstream contact heat exchanger to the inlet of said gas turbine member; and means for transferring the hot low-pressure exhaust gases discharged from said downstream contact heat exchanger to the exhaust-fluid inlet of the aforesaid upstream regenerative contact heat exchanger.

14. The regenerative gas turbine power plant of claim 13 wherein the upstream regenerative contact heat exchanger includes a closed plenum or ducting chamber providing a centrally-disposed diffuser passage enclosed by an annular enveloping nozzle passage in the receiver section thereof, and the downstream contact heat exchanger includes a closed plenum or ducting chamber providing a centrally-disposed nozzle passage enclosed by an annular enveloping diffuser passage in the receiver section thereof; the said upstream and downstream contact heat exchangers being disposed to discharge separated intake-fluid and exhaust-fluid streams after the contact interchange of energy therebetween.

15. The regenerative gas turbine power plant of claim 13 wherein the upstream regenerative contact heat exchanger includes a closed plenum or ducting chamber providing a centrally-disposed nozzle passage enclosed by an annular enveloping diffuser passage in the receiver section thereof, and the downstream contact heat exchanger includes a closed plenum or ducting chamber providing a centrally-disposed diffuser passage enclosed by an annular enveloping nozzle passage in the receiver section thereof; the said upstream and downstream contact heat exchangers being disposed to discharge separated intake-fluid and exhaust-fluid streams after the contact interchange of energy therebetween.

16. The regenerative gas turbine power plant of claim 13 wherein both the upstream and downstream contact heat exchangers includes a closed plenum or ducting chamber providing a centrally-disposed diffuser passage enclosed by an annular enveloping nozzle passage in the receiver section thereof; the said upstream and downstream contact heat exchangers being disposed to discharge separated intake-fluid and exhaust-fluid streams after the contact interchange of energy therebetween.

17. The regenerative gas turbine power plant of claim 13 wherein both the upstream and downstream contact heat exchangers includes a closed plenum or ducting chamber providing a centrally-disposed nozzle passage enclosed by an annular enveloping diffuser passage in the receiver section thereof; the said upstream and downstream contact heat exchangers being disposed to discharge separated intake-fluid and exhaust-fluid streams after the contact interchange of energy therebetween.

18. A regenerative gas turbine power plant comprising in combination, a multiple-stage gas turbine member; a multiple-stage compressor member driven by said gas turbine member; a non-reversing, single-pass fluid-to-fluid contact heat exchanger; said contact heat exchanger being adapted to effect the regenerative pre-heating of compressed intake fluids for said gas turbine member before combustion by contact interchange with hot low-pressure gases from the exhaust of said gas turbine member; an inetgral closed heat exchanger member disposed between stages of said compressor member to receive and cool the compressed intake fluid discharge of an upstream compressor stage and to discharge the cooled intake fluid stream to a downstream compressor stage; a combustion chamber disposed upstream of said gas turbine member to receive the pre-heated intake fluid stream discharged by said regenerative contact heat exchanger and supplying combustible fuel thereto; an interstage combustion chamber disposed between stages of said gas turbine member to receive and re-combust the partly expanded exhaust fluid discharge of an upstream turbine stage and to discharge the heated, partly-expanded combusted fluid stream to a downstream turbine sage; means for transferring to said regenerative contact heat exchanger the compressed intake fluids discharged from said compressor member; means for transferring to said regenerative contact heat exchanger the hot low-pressure exhaust gases discharged from said gas turbine member; said regenerative contact heat exchanger being adapted to receive and exchange energy between the compressed intake fluid stream and hot, low-pressure exhaust gases discharged from said gas turbine member while particles of the said intake and exhaust fluid streams are in contact and possess substantially unequal and parallel velocity vectors with respect to each other; said regenerative contact heat exchanger being adapted to separate the aforesaid intake fluid and exhaust gas streams following the contact interchange of energy therebetween, and to discharge cooled exhaust gases to the atmosphere; means for transferring the pre-heated intake fluid stream discharged from the said regenerative contact heat exchanger to the inlet of said upstream combustion chamber and from the exit of said upstream combustion chamber to the inlet of said gas turbine member; and means for transferring the partially-expanded combusted fluid stream discharged from the upstream turbine stage of said gas turbine member to the inlet of said interstage combustion chamber, and from the exit of said interstage combustion chamber to the inlet of the downstream turbine stage of said gas turbine member; whereby the energy present in the high-temperature combusted fluid stream is partially converted to useful mechanical energy as said combusted fluid stream is expanded within the several stages of said gas turbine member.

19. The intercooled reheat-regenerative gas turbine power plant of claim 18 wherein the regenerative contact heat exchanger includes a closed plenum or ducting chamber providing a centrally-disposed diffuser passage enclosed by an annular enveloping nozzle passage in the receiver section thereof; said regenerative contact heat exchanger being adapted to discharge separated intake and exhaust fluid streams after the contact interchange of energy therebetween.

20. The intercooled reheat-regenerative gas turbine power plant of claim 18 wherein the regenerative contact heat exchanger includes a closed plenum or ducting chamber providing a centrally-disposed nozzle passage enclosed by an annular enveloping diffuser passage in the receiver section thereof; said regenerative contact heat exchanger being adapted to discharge separated intake and exhaust fluid streams after the contact interchange of energy therebetween.

21. A regenerative gas turbine power plant comprising in combination, a plurality of gas turbine members each connected in parallel with and supplied with high-temperature combusted intake fluids from a common combustion chamber; a compressor member driven by one member of the said plurality of gas turbine members; a non-reversing single-pass fluid-to-fluid contact heat exchanger; said contact heat exchanger being adapted to effect the regenerative pre-heating of compressed intake fluids for the said plurality of gas turbine members before combustion by contact interchange with hot low-pressure gases from the exhausts of the said plurality of gas turbine members; a common combustion chamber disposed upstream of the said plurality of gas turbine members to receive the pre-heated intake-fluid stream discharged by said regenerative contact heat exchanger and supplying combustible fuel thereto; the said common combustion chamber disposed to supply each member of the said plurality of gas turbine members with high-temperature combusted intake fluids; means for transferring to said regenerative contact heat exchanger member the compressed intake fluids discharged from said compressor member; means for transferring to said regenerative contact heat exchange the hot low-pressure exhaust gases discharged from each member of the said plurality of gas turbines; said regenerative contact heat exchanger being adapted to receive and exchange energy between the compressed intake fluid stream and hot low-pressure exhaust gases discharged from said gas turbine members while particles of the said intake and exhaust fluid streams are in contact and possess substantially unequal and parallel velocity vectors with respect to each other; said regenerative contact heat exchanger being adapted to separate the aforesaid intake fluid and exhaust gas streams following the contact interchange of energy therebetween, and to discharge cooled exhaust gases to atmosphere; means for transferring the pre-heated intake fluid stream discharged from the said regenerative contact heat exchanger to the inlet of said common combustion chamber; means for transferring the high-temperature combusted intake fluids discharged from said common combustion chamber to the inlets of each member of the said plurality of gas turbines; and valve means disposed in the inlet and exhaust branches of the said plurality of gas turbines whereby individual gas turbine members may be alternately isolated from each other and from the regenerative gas turbine cycle; whereby the energy present in the high-temperature combusted fluid streams leaving the common combustion chamber is partially converted to useful mechanical energy as the said high-temperature combusted intake fluid streams are expanded within the said plurality of gas turbine members.

22. The multi-shaft regenerative gas turbine power plant of claim 21 wherein valve means in the inlet branches of individual gas turbines are disposed to throttle the flow of high-temperature combusted intake fluids thereinto.

23. The multi-shaft regenerative gas turbine power plant of claim 21 wherein the regenerative contact heat exchanger includes a closed plenum or ducting chamber providing a centrally-disposed diffuser passage enclosed by an annular enveloping nozzle passage in the receiver section thereof; said regenerative contact heat exchanger being adapted to disechargde separated intake and exhaust fluid streams after the contact interchange of enrgy therebetween.

24. The multi-shaft regenerative gas turbine power plant of claim 21 wherein the regenerative contact heat exchanger includes a closed plenum or ducting chamber providing a centrally-disposed nozzle passage enclosed by an annular enveloping diffuser passage in the receiver section thereof; said regenerative contact heat exchanger being adapted to discharge separated intake and exhaust fluid streams after the contact interchange of energy therebetween.

25. A regenerative gas turbine power plant comprising in combination, a plurality of gas turbine members each connected in parallel with respect to each other in cycle branches of said gas turbine power plant; a plurality of combustion chambers having individual members each disposed to supply one companion member of the said plurality of gas turbine members with high-temperature combusted intake fluids; a compressor member driven by one member of the said plurality of gas turbine members; a non-reversing single-pass fluid-to-fluid contact heat exchanger; said contact heat exchanger being adapted to effect the regenerative pre-heating of compressed intake fluids for the said plurality of gas turbine members before combustion by contact interchange with hot low-pressure gases from the exhausts of said plurality of gas turbine members; means for transferring to said regenerative contact heat exchanger the compressed intake fluids discharged from said compressor member; means for transferring to said regenerative contact heat exchanger the hot low-pressure exhaust gases discharged from each member of the said plurality of gas turbines; said regenerative contact heat exchanger being adapted to receive and exchange energy between the compressed intake fluid stream and hot low-pressure exhaust gases discharged from said gas turbine members while particles of said intake and exhaust-fluid streams are in contact and possess substantially unequal and parallel velocity vectors with respect to each other; said regenerative contact heat exchanger being adapted to separate the aforesaid intake-fluid and exhaust-fluid streams following the contact interchange of energy therebetween, and to discharge cooled exhaust gases to atmosphere; means for transferring the pre-heated intake fluid stream discharged from the said regenerative contact heat exchanger to the inlet of each member of the said plurality of combustion chambers; and means for transferring the high-temperature combusted intake fluids discharged from each member of the said plurality of combustion chambers to the inlet of its respective companion gas turbine members; whereby the energy present in the high-temperature combusted fluid streams leaving the said combustion chambers is converted to useful mechanical energy as the said high-temperature combusted intake-fluid streams are expanded within the said gas turbine members.

26. The multi-shaft regenerative gas turbine power plant of claim 25 wherein the regenerative contact heat exchanger includes a closed plenum or ducting chamber providing a centrally-disposed diffuser passage enclosed by an annular enveloping nozzle passage in the receiver section thereof; said regenerative contact heat exchanger being adapted to discharge separated intake and exhaust-fluid streams after the contact interchange of energy therebetween.

27. The multi-shaft regenerative gas turbine power plant of claim 25 wherein the regenerative contact heat exchanger includes a closed plenum or ducting chamber providing a centrally-disposed nozzle passage enclosed by an annular enveloping diffuser passage in the receiver section thereof; said regenerative contact heat exchanger being adapted to discharge separated intake and exhaust-fluid streams after the contact interchange of energy therebetween.

References Cited
UNITED STATES PATENTS

| | | | |
|---|---|---|---|
| 2,280,765 | 4/1942 | Anxionnaz | 60—39.15 |
| 2,974,495 | 3/1961 | Pinnes | 60—104 |
| 3,046,732 | 7/1962 | Foa | 60—269 |

FOREIGN PATENTS

| | | | |
|---|---|---|---|
| 869,355 | 5/1961 | Great Britain | 165—1 |

MARK M. NEWMAN, Primary Examiner

W. E. OLSEN, Assistant Examiner

U.S. Cl. X.R.

60—39.16, 39.51, 58, 59; 165—1, 52